Aug. 5, 1924.

J. F. MATTHIES

MEAT CHOPPING MACHINE

Filed May 27, 1924

1,504,067

WITNESSES

INVENTOR
John F. Matthies
BY
ATTORNEYS

Patented Aug. 5, 1924.

1,504,067

UNITED STATES PATENT OFFICE.

JOHN FRIEDERIK MATTHIES, OF NEW YORK, N. Y.

MEAT-CHOPPING MACHINE.

Application filed May 27, 1924. Serial No. 716,201.

*To all whom it may concern:*

Be it known that I, JOHN F. MATTHIES, a citizen of the United States of America, and a resident of the city of New York, borough of the Bronx, in the county of Bronx and State of New York, have invented a new and Improved Meat-Chopping Machine, of which the following is a description.

My invention relates to a meat chopper and particularly to a meat chopper provided with a hopper by which the meat to be chopped is delivered to a feed screw which advances the meat toward a perforated disk and knife assemblage at the discharge end of the casing of the chopper. With the ordinary meat chopper of the type indicated, the knife is adjusted in close relation to the perforated disk from which the chopped meat exudes. If the knife is not adjusted close the chopping action is ineffective and on the other hand if the knife is adjusted too close to the disk and has an unyielding relation thereto, the knife quickly dulls.

The general object of my invention is to provide a chopper of the indicated type in which the feed screw is maintained in an effective manner in yielding relation to the perforated disk, whereby the quick dulling of the knife is avoided.

More specifically, the invention has for an object to provide a spring bearing assemblage in association with the feed screw to exert yielding pressure thereon and on the knife relatively to the perforated disk, whereby the assemblage can be emplaced in the casing, or removed therefrom, as a unit.

The nature of my invention and its distinguishing features and advantages will more clearly appear as the description proceeds.

Reference is to be had to the accompanying drawings forming a part of this specification, it being understood that the drawings are merely illustrative of one example of the invention.

Figure 1:
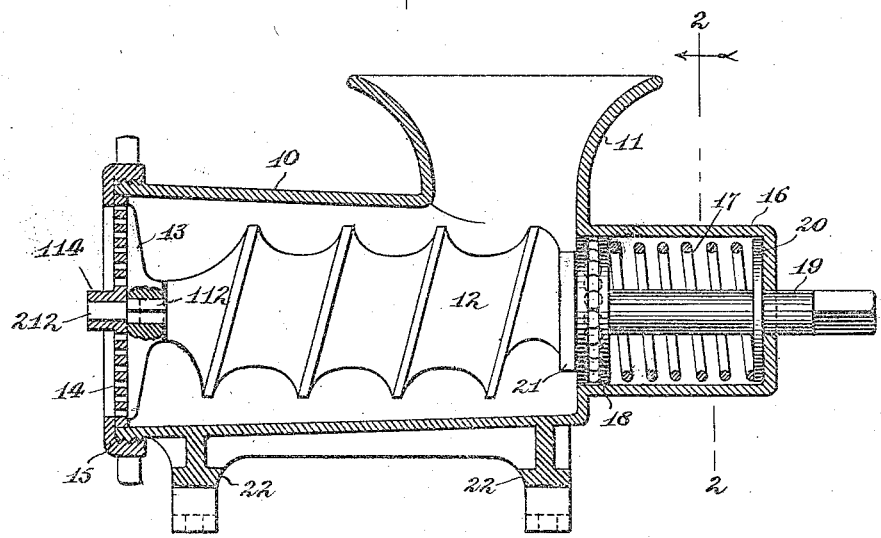
Figure 1 is a longitudinal section of a meat chopper embodying my invention.
Figure 2:
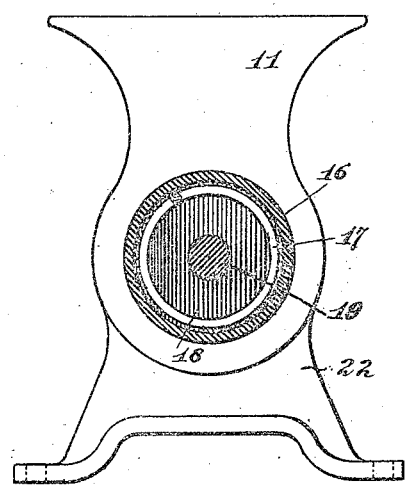
Figure 2 is a transverse vertical section as indicated by the line 2—2, Figure 1.

In carrying out my invention in accordance with the illustrated example, a horizontal casing 10 is provided having a hopper 11 through which the meat to be chopped is delivered, the meat passing in the usual manner to a feed screw 12 having a knife 13 fixed to said screw at a square zone 112 thereof, said screw having a terminal journal 212 turning in the central bearing boss 114 of the perforated disk 14 through which the chopped meat is forced by the turning of the screw. The numeral 15 indicates a screw cap threaded onto the front end of the casing 10 and serving to retain the disk 14 in place in close relation to the knife 13.

The general features referred to are known in the type of meat choppers to which my invention relates.

In accordance with my invention the rear end of the casing 10 in the rear of the hopper 11 is elongated materially to produce a housing extension 16. A coil spring 17 is provided in the housing 16. Said spring at its front end abuts against a bearing 18, advantageously in practice a ball bearing assemblage, the spring abutting at its rear end against a washer 20 on the shaft 19 of the screw 12, said collar 20 lying against the rear end of the housing 16, said rear end of the housing being closed except for the center opening affording a bearing for the shaft 19 to which shaft a crank (not shown) is applied in practice as is usual with meat choppers of this character. It is to be understood that the shaft 19 is slidable through the rear end of housing 16 and through washer 20, so that said washer simply forms a thrust bearing for the rear end of the spring.

The bearing assemblage 18, it will be observed, forms a closure of the front end of the housing 16 preventing the entrance of meat into said housing.

With the described arrangement the spring 17 exerts a forward pressure on the bearing assemblage 18 and on an adjacent collar 21 at the rear end of the screw 12, the result being that the screw 12 is forced forwardly and with it the knife 13 is under the spring pressure, and the knife is pressed forwardly into close and proper cutting relation to the disk 14. Under the described arrangement excessive resistance to the knife 13 at the disk 14, the complete assemblage including the knife 13, the screw 12, the bearing assemblage 18 and shaft 19 is free to yield to the resistance owing to the spring 17. At the same time the construction provides an efficient housing for the spring. Moreover, with the described arrangement, when the cap 15 is removed, the whole assemblage including the knife, feed screw, its shaft, the bearing assemblage, and the spring 17 with collar 20 may be removed as a unit and said unit may be readily emplaced again and secured in the proper relation by the cap 15.

The invention may be embodied in a meat chopper having any suitable means to support the casing 10 such, for example, as known forms of legs 22.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A meat chopping machine including a casing, and a hopper through which the meat to be chopped may be fed, said casing furthermore having at the rear end a housing extension rearward of the feed hopper and at the front end a perforated disk through which the chopped meat may exude, as well as retaining means for said disk, a feed screw in said casing, a knife turning with said screw adjacent to the perforated disk, a shaft extending from the rear end of the feed screw through said housing, a spring coiled about said shaft within said housing, and a bearing assemblage at the front end of said spring and forming a closure for the front end of said housing, said shaft turning in said bearing assemblage and having a bearing in said disk, and said spring abutting at its front end against said bearing assemblage and thereby exerting a forward pressure on the feed screw and knife, the said feed screw, disk, shaft, spring, and bearing assemblage constituting a unit and being placeable and removable as such through the front end of said casing when said retaining means is removed.

2. In a meat chopping machine, a casing having a feed opening and having a housing extension in the rear of the said opening, a feed screw in said casing, the shaft of the feed screw extending through said housing, a spring coiled about said shaft and exerting forward pressure on the feed screw, a knife turning with the feed screw at the front end, and a perforated disk adjacent to which said knife turns.

3. In a meat chopping machine, a casing having a feed opening and having a housing extension in the rear of the said opening, a feed screw in said casing, the shaft of the feed screw extending through said housing, a spring coiled about said shaft and exerting forward pressure on the feed screw, a knife turning with the feed screw at the front end, and a perforated disk adjacent to which said knife turns; together with means closing the front end of said housing in front of the spring.

4. In a meat chopping machine, a casing having a feed opening and having a housing extension in the rear of the said opening, a feed screw in said casing, the shaft of the feed screw extending through said housing, a spring coiled about said shaft and exerting forward pressure on the feed screw, a knife turning with the feed screw at the front end, and a perforated disk adjacent to which said knife turns; together with a bearing assemblage closing said housing in front of said spring and receiving the thrust of the latter.

5. In a meat chopping machine, a casing having a feed opening, a feed screw in said casing to receive material fed through said opening, a perforated disk to which the material is fed by the screw, a knife turning with the screw directly adjacent to said disk, and a spring exerting pressure on the screw in a forward direction to maintain the knife in yielding contact with said disk.

JOHN FRIEDERIK MATTHIES.